United States Patent
Mastronardi

(10) Patent No.: US 10,127,759 B2
(45) Date of Patent: *Nov. 13, 2018

(54) PROCESS FOR SELECTING A RECORDING ON A DIGITAL AUDIOVISUAL REPRODUCTION SYSTEM, AND SYSTEM FOR IMPLEMENTING THE PROCESS

(75) Inventor: Tony Mastronardi, Pierrefonds (CA)

(73) Assignee: TouchTunes Music Corporation, New York, NY (US)

( * ) Notice: Subject to any disclaimer, the term of this patent is extended or adjusted under 35 U.S.C. 154(b) by 1019 days.

This patent is subject to a terminal disclaimer.

(21) Appl. No.: 12/292,123

(22) Filed: Nov. 12, 2008

(65) Prior Publication Data

US 2009/0138111 A1 May 28, 2009

Related U.S. Application Data

(63) Continuation of application No. 09/888,540, filed on Jun. 26, 2001, now Pat. No. 7,500,192, which is a
(Continued)

(30) Foreign Application Priority Data

Sep. 25, 1996 (FR) .................... 96 11677

(51) Int. Cl.
*G06F 3/048* (2013.01)
*G07F 17/30* (2006.01)
(Continued)

(52) U.S. Cl.
CPC .......... *G07F 17/305* (2013.01); *G11B 27/002* (2013.01); *G11B 27/34* (2013.01); *G11B 33/10* (2013.01)

(58) Field of Classification Search
CPC .................................................. G07F 17/305
See application file for complete search history.

(56) References Cited

U.S. PATENT DOCUMENTS

| | | |
|---|---|---|
| 3,807,541 A | 4/1974 | Kortenhaus |
| 3,982,620 A | 9/1976 | Kortenhaus |

(Continued)

FOREIGN PATENT DOCUMENTS

| | | |
|---|---|---|
| AU | 199954012 | 4/2000 |
| DE | 3406058 | 8/1985 |

(Continued)

OTHER PUBLICATIONS

Patent Abstracts of Japan vol. 95, No. 010 & JP 07 281682 A (Nagao Yuasa), Oct. 27, 1995, & JP 07 281682, figure 1-6 abrége.

(Continued)

*Primary Examiner* — Peiyong Weng
(74) *Attorney, Agent, or Firm* — Nixon & Vanderhye, P.C.

(57) ABSTRACT

A process of selecting a recording on an audiovisual reproduction system consists of displaying a number of windows on a touch screen as an interface with a user. Items of information are stored in a bulk memory and are representative of an image of the album cover that is associated with each window and whose corresponding musical recording is stored in the bulk memory of the reproduction system. Each zone of a window is associated, via the touch-screen interface software, with at least one address for accessing the items of information in the database that is stored in the bulk memory belonging to the album cover whose image is displayed in the window that is touched by the user.

4 Claims, 9 Drawing Sheets

Related U.S. Application Data continuation of application No. 08/935,826, filed on Sep. 23, 1997, now Pat. No. 6,346,951.

(51) Int. Cl.
*G11B 27/00* (2006.01)
*G11B 27/34* (2006.01)
*G11B 33/10* (2006.01)

(56) References Cited

U.S. PATENT DOCUMENTS

| | | |
|---|---|---|
| 4,008,369 A | 2/1977 | Theurer et al. |
| 4,186,438 A | 1/1980 | Benson et al. |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam et al. |
| 4,413,260 A | 11/1983 | Siegel et al. |
| 4,521,014 A | 6/1985 | Sitrick |
| 4,528,643 A | 7/1985 | Freeny, Jr. |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza et al. |
| 4,588,187 A | 5/1986 | Dell |
| 4,593,904 A | 6/1986 | Graves |
| 4,597,058 A | 6/1986 | Izumi et al. |
| 4,636,951 A | 1/1987 | Harlick |
| 4,652,998 A | 3/1987 | Koza et al. |
| 4,654,799 A | 3/1987 | Ogaki et al. |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki et al. |
| 4,703,465 A | 10/1987 | Parker |
| 4,704,725 A | 11/1987 | Harvey et al. |
| 4,704,804 A | 11/1987 | Leal |
| 4,707,804 A | 11/1987 | Leal |
| 4,722,053 A | 1/1988 | Dubno |
| 4,761,684 A | 8/1988 | Clark et al. |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples, Jr. et al. |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers et al. |
| 4,922,420 A | 5/1990 | Nakagawa et al. |
| 4,924,378 A | 5/1990 | Hershey |
| 4,926,485 A | 5/1990 | Yamashita |
| 4,937,807 A | 6/1990 | Weitz et al. |
| 4,949,187 A | 8/1990 | Cohen |
| 4,953,159 A | 8/1990 | Hayden et al. |
| 4,956,768 A | 9/1990 | Sidi et al. |
| 4,958,835 A | 9/1990 | Tashiro et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru et al. |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A | 5/1992 | Vogel |
| 5,138,712 A | 8/1992 | Corbin |
| 5,148,159 A | 9/1992 | Clark et al. |
| 5,155,847 A | 10/1992 | Kirouac |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A * | 8/1993 | Kaplan .................. 235/375 |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,339,413 A | 6/1994 | Koval |
| 5,327,230 A | 7/1994 | Dockery |
| 5,339,095 A | 8/1994 | Redford |
| 5,341,350 A | 8/1994 | Frank et al. |
| 5,355,302 A * | 10/1994 | Martin ............... G06Q 20/1235 700/234 |
| 5,357,276 A | 10/1994 | Banker |
| 5,369,778 A | 11/1994 | Sansoucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |

(56) References Cited

U.S. PATENT DOCUMENTS

| | | |
|---|---|---|
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,612,581 A | 3/1997 | Kageyama |
| 5,613,909 A | 3/1997 | Stelovsky |
| 5,616,876 A * | 4/1997 | Cluts ........................... 84/609 |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,829 A | 2/1998 | Dunn et al. |
| 5,724,525 A | 3/1998 | Beyers, II et al. |
| 5,726,909 A | 3/1998 | Krikorian |
| 5,727,160 A * | 3/1998 | Ganesan ............... H04W 84/14 |
| | | 370/364 |
| 5,734,719 A * | 3/1998 | Tsevdos et al. ............... 700/234 |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,751,336 A | 5/1998 | Aggarwal et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,193 A | 3/1999 | Takahashi |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A * | 9/1999 | Doerr et al. ................... 715/716 |
| 5,949,688 A | 9/1999 | Montoya et al. |
| 5,953,429 A | 9/1999 | Wakai et al. |

(56) References Cited

U.S. PATENT DOCUMENTS

| | | |
|---|---|---|
| 5,956,716 A | 9/1999 | Kenner et al. |
| 5,959,869 A | 9/1999 | Miller |
| 5,959,945 A | 9/1999 | Kleiman |
| 5,963,916 A * | 10/1999 | Kaplan ............ G06F 17/30749 705/26.8 |
| 5,966,495 A | 10/1999 | Takahashi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 * | 10/2001 | Nathan ................ G07F 17/305 348/E7.073 |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,107,109 B1 | 9/2006 | Nathan et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |

(56) References Cited

U.S. PATENT DOCUMENTS

| | | |
|---|---|---|
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0129036 A1 | 9/2002 | Ho Yuen Lok et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0208586 A1 | 11/2003 | Mastronardi et al. |
| 2003/0225834 A1 | 12/2003 | Lee et al. |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0060405 A1 | 3/2005 | Nathan et al. |
| 2005/0073782 A1 | 4/2005 | Nathan |
| 2005/0086172 A1 | 4/2005 | Stefik |
| 2005/0125833 A1 | 6/2005 | Nathan et al. |
| 2005/0267819 A1 | 12/2005 | Kaplan |
| 2006/0018208 A1 | 1/2006 | Nathan et al. |
| 2006/0035707 A1 | 2/2006 | Nguyen et al. |
| 2006/0062094 A1 | 3/2006 | Nathan et al. |
| 2006/0239131 A1 | 10/2006 | Nathan et al. |
| 2006/0293773 A1 | 12/2006 | Nathan et al. |
| 2007/0121430 A1 | 5/2007 | Nathan |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0247979 A1 | 10/2007 | Brillon et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0239887 A1 | 10/2008 | Tooker et al. |
| 2009/0037969 A1 | 2/2009 | Nathan et al. |
| 2009/0070341 A1 | 3/2009 | Mastronardi et al. |
| 2009/0138111 A1 | 5/2009 | Mastronardi |
| 2009/0265734 A1 | 10/2009 | Dion et al. |
| 2009/0282491 A1 | 11/2009 | Nathan |
| 2010/0042505 A1 | 2/2010 | Straus |
| 2010/0211818 A1 | 8/2010 | Nathan |
| 2010/0241259 A1 | 9/2010 | Nathan |
| 2010/0269066 A1 | 10/2010 | Nathan |

FOREIGN PATENT DOCUMENTS

| | | |
|---|---|---|
| DE | 3723737 A1 | 1/1988 |
| DE | 3820835 A1 | 1/1989 |
| DE | A 3820835 | 1/1989 |
| DE | 3815071 | 11/1989 |
| DE | 4 244 198 | 6/1994 |
| DE | 19610739 | 9/1997 |
| DE | 19904007 | 8/2000 |
| EP | A0082077 | 6/1983 |
| EP | 0140593 A2 | 5/1985 |
| EP | 0256921 | 2/1988 |
| EP | 0283304 | 9/1988 |
| EP | A 0283350 | 9/1988 |
| EP | 0 309 298 | 3/1989 |
| EP | A 0313359 | 4/1989 |
| EP | 0340787 | 11/1989 |
| EP | 0363186 | 4/1990 |
| EP | 0 425 168 A | 5/1991 |
| EP | O 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | A 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974896 A1 | 1/2000 |
| EP | 0974941 | 1/2000 |
| EP | 0982695 | 3/2000 |
| EP | 1001391 | 5/2000 |
| EP | 1408427 | 4/2004 |
| FR | A 2602352 | 2/1988 |
| FR | 2808906 | 11/2001 |
| GB | A 2122799 | 1/1984 |
| GB | 2166328 A | 4/1986 |
| GB | 2170943 | 8/1986 |
| GB | 2193420 | 2/1988 |
| GB | 2 238680 A | 6/1991 |
| GB | 2254469 | 10/1992 |
| GB | 2 259 398 A | 3/1993 |
| GB | 2259398 | 3/1993 |
| GB | 2262170 A | 6/1993 |
| GB | 2380377 | 4/2003 |
| JP | 57-173207 | 10/1982 |
| JP | 58-179892 | 10/1983 |
| JP | 60-253082 | 12/1985 |
| JP | 61-084143 | 4/1986 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5122282 | 5/1993 |
| JP | 5-74078 | 10/1993 |
| JP | 07281682 | 10/1995 |
| JP | 08-279235 | 10/1996 |
| JP | 8274812 | 10/1996 |
| JP | 10-098344 | 4/1998 |
| WO | WO 86 01326 A | 2/1986 |
| WO | WO A 90 07843 | 7/1990 |
| WO | WO 91/08542 | 6/1991 |
| WO | WO A 91 20082 | 12/1991 |
| WO | WO 93/16557 | 8/1993 |
| WO | WO 93 18465 A | 9/1993 |
| WO | WO A 94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |

(56) References Cited

FOREIGN PATENT DOCUMENTS

| WO | WO 96/12255 | 4/1996 | | |
|---|---|---|---|---|
| WO | WO 96 12255 A | 4/1996 | | |
| WO | WO 96/12256 | 4/1996 | | |
| WO | WO 96 12256 | 4/1996 | | |
| WO | WO 96/12257 | 4/1996 | | |
| WO | WO 96 12258 A | 4/1996 | | |
| WO | WO 9612257 A1 * | 4/1996 | ........... | G07F 17/305 |
| WO | WO 98/07940 | 2/1998 | | |
| WO | WO 98/45835 | 10/1998 | | |
| WO | WO 01/00290 | 1/2001 | | |
| WO | WO 01/08148 | 2/2001 | | |
| WO | WO 02/095752 | 11/2002 | | |
| WO | WO 2006/014739 | 2/2006 | | |

OTHER PUBLICATIONS

Bonczck, Robert H. et al, "The DSS Development System", 1983 National Computer Conference, Anaheim, California, May 16-19, 1983, pp. 441-455.
IBM Technical Disclosure Bulletin, vol. 30, No. 5, Oct. 1987, "Method for Automated Assembly of Software Versions", pp. 353-355.
"Robotic Wafer Handling System for Class 10 Environments" IBM Technical Disclosure Bulletin, vol. 32, No. 9A, Feb. 1990, pp. 141-143.
"High-speed Opens and Shorts Substrate Tester", IBM Technical Disclosure Bulletin, vol. 33, No. 12, May 1991, pp. 251-259.
"Darts Revolution Again", Replay Magazine, Mar. 1991, pp. 146-148.
Galen A. Grimes, "Chapter 18, Taking Advantage or Web-based Audio."
Petri Koskelainem "Report on Streamworks™".
W. Richard Stevens, "TCP/IP Illustrated: vol. 1, the Protocols".
Nowell Outlaw "Virtual Servers Offer Performance benefits for Networks Imaging".
"Ecast Forges Landmark International Technology Partnership", Business Wire at www.findarticles.com/cf_0/m0EIN/2000_July_25/63663604/print.jhtml, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Derfler et al., "How Networks Work", Millennium Ed., Que Corporation, Jan. 2000.
European Search Report from EP 1 993 079.
European Search Report issued for European Application No. 08000845.1.1238/1962251, dated Apr. 3, 2009.
Gralla, "How the Internet Works", Millennium Ed., Que Corporation, Aug. 1999.
Hicks et al., "Dynamic software updating", ACM PLDI, pp. 13-23, 2001.
iTOUCH 27 New Games brochure, JVL Corporation, 2005, 2 pages.
iTouch 8 Plus brochure, JVL Corporation, 2005, 2 pages.
Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Schneier, "Applied Cryptography", Second Edition, John Wiley & Sons, Inc. New York, 1996.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).

* cited by examiner

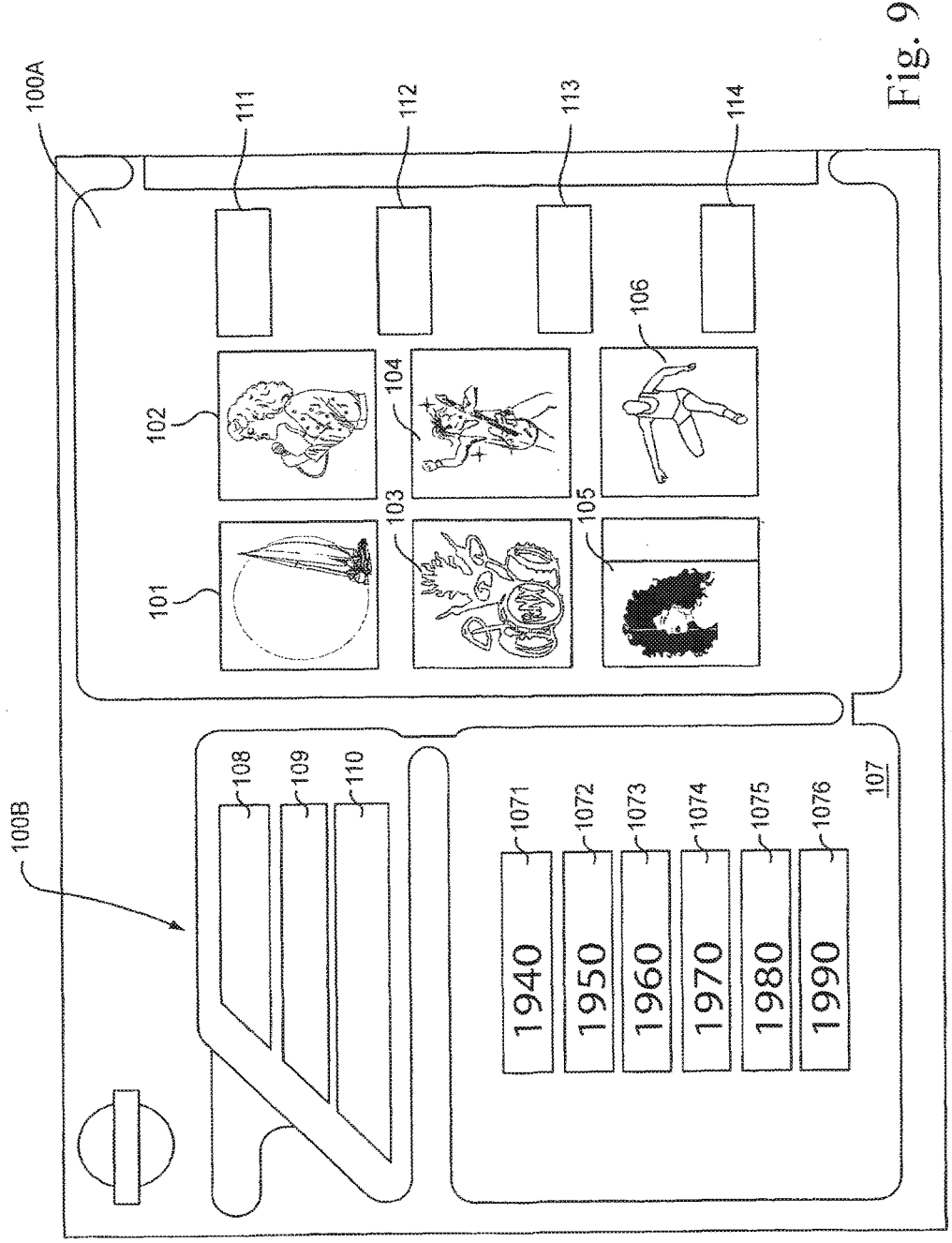

PROCESS FOR SELECTING A RECORDING ON A DIGITAL AUDIOVISUAL REPRODUCTION SYSTEM, AND SYSTEM FOR IMPLEMENTING THE PROCESS

CROSS-REFERENCES TO RELATED APPLICATIONS

This application is a continuation of application Ser. No. 09/888,540, filed Jun. 26, 2001, which is a continuation of application Ser. No. 08/935,826, filed Sep. 23, 1997, both applications claim priority to French patent application 96 11677, filed Sep. 25, 1996, the entire disclosures of which are hereby incorporated herein by reference.

BACKGROUND OF THE INVENTION

This invention pertains to a process for selecting a recording on a digital audiovisual reproduction system with a touch screen, and the system for implementing the process.

Such audiovisual reproduction systems are generally found in cafes or pubs and are composed of a sound reproduction machine, generally referred to as a jukebox, connected to a monitor that displays video images or video clips. To do this, the jukebox is equipped with a video compact-disk reader and a library of video compact disks and includes pre-selection buttons that show the titles of the works of music that are to be selected. Payment of an adequate fee, followed by one or more pre-selections, activates the system, whereby the disk on which the selected work is found is automatically loaded into the reader, and the desired audiovisual reproduction can began.

Although these systems allow reliable and good-quality reproduction, they still have some serious drawbacks. A first drawback relates to the space that is required for storing the library. The library of disks requires that the system be of significant size. Likewise, these systems, which employ mainly mechanical hardware, use sophisticated techniques that lead to frequent and costly malfunctions. Moreover, it is quite uncommon for all of the works on a single disk to be listened to regularly, and some are almost never listened to, but the entire disk must be included in the library. Another drawback is due to the fact that the companies that manage and distribute these systems circulate a limited number of identical disks and require a certain amount of rotation among their clients. Consequently, the clients are sometimes made to wait when a disk is not available.

It is known from patent PCT/WO 93 184 65 that there are computerized jukeboxes that make it possible to receive, through a telecommunications network and a modem that connects the jukebox to the network, digitized information that comprises songs or works of music, which are remotely loaded into a bulk memory of the jukebox. The communication system can also remotely load files that are representative of digitized graphical data, whereby the songs and graphical files are compressed before they are sent onto the network. The jukebox processor then makes use of these files by decompressing them and sending the graphical data to the video circuit and the song data to the audio circuit.

The processor, however, also manages the user interfaces, and the management of these different elements is accomplished sequentially by displaying the graphic images that are representative of the song and then responding to the user's activation of the keys, then by re-loading if the user has paid the desired amount and, finally, when the desired amount has been paid, by placing the selection in a queue to be played later. Moreover, this system can operate only by first displaying the graphic images and then initiating the playback of the song because, according to the logic diagrams, the processor cannot execute two tasks at the same time.

The activation of the keys by a user requires a certain amount of training, is a source of errors, and also extends song selection time.

SUMMARY OF THE INVENTION

The object of this invention is a recording selection process that is convenient and easy to use, even for a beginner.

This object is achieved by providing a process for selecting a recording on an audiovisual reproduction system using friendly on-screen windows. Moreover, with the friendly windows, data required for the display can be selected from information that is stored in a bulk memory representing an image of the recording cover. Corresponding music recordings are stored in the bulk memory of the reproduction system, and each zone of a window is associated with at least one address for accessing the information of the databases via a touch-screen interface.

According to another feature, a light touch on one of the windows causes the corresponding cover to be displayed with the various titles that can be selected from this cover. The selection of a title can then be made by lightly touching one of the titles on the list, and playback is accomplished by lightly touching an alphanumeric tile.

According to another feature, an area that includes several graphic display tiles in which the images of available covers by the same artist are displayed.

According to another feature, one strip or zone of the screen includes arrows at each end effecting scrolling in one direction or the other so as to display the other images of covers that cannot be displayed in the windows or the display tiles.

According to another feature, the window zone, which includes the several windows, displays a cover in each window and includes representations of selection criteria for searching the database of the system. The selection criterion can be activated when the user touches the screen. The selection criterion consists of data ranges such as recent decades, music category, song index, etc.

Another object of the invention is to propose an audiovisual reproduction system that makes it possible to implement the process.

This object is achieved with an audiovisual reproduction system developed around a microprocessor device that is associated with a payment device. The system includes bulk storage for, among other things, storing visual and sound recordings in compressed digital form. The system interfaces with a digital display and digital sound reproduction structure, whereby a video monitor is connected to a touch screen which, in turn, is connected to an interface program to react to a user touching the touch screen. These contacts are translated for the operating system as mouse events which, via a library of integrated tools and services, initiates the modification of the running of one of the interface program modules. Each display zone of the video monitor, associated with the touch screen, is associated with a criterion for searching the database of the visual or audio representation data corresponding to the information displayed on the screen.

According to another feature, the search criterion is the selection of a number of albums corresponding to the number of windows that can be displayed on the screen and the associated graphical information. The search criterion may additionally or alternatively consist of music category, date range, etc.

According to another feature, scanning of the database is done in increments of the size of the number of windows that can be displayed on the selection screen.

BRIEF DESCRIPTION OF THE DRAWINGS

Other advantages and features of this invention will become clear from reading the following description with reference to the attached drawings, which are given as illustrative but non-limiting examples of an embodiment of the invention, in which:

FIG. 9 shows the graphic display corresponding to a second selection menu validation mode.

DETAILED DESCRIPTION OF PREFERRED EMBODIMENTS

Preferably, the audiovisual reproduction system according to the invention uses the items of hardware listed and referenced below, but it is not limited thereto.

Figure 1:
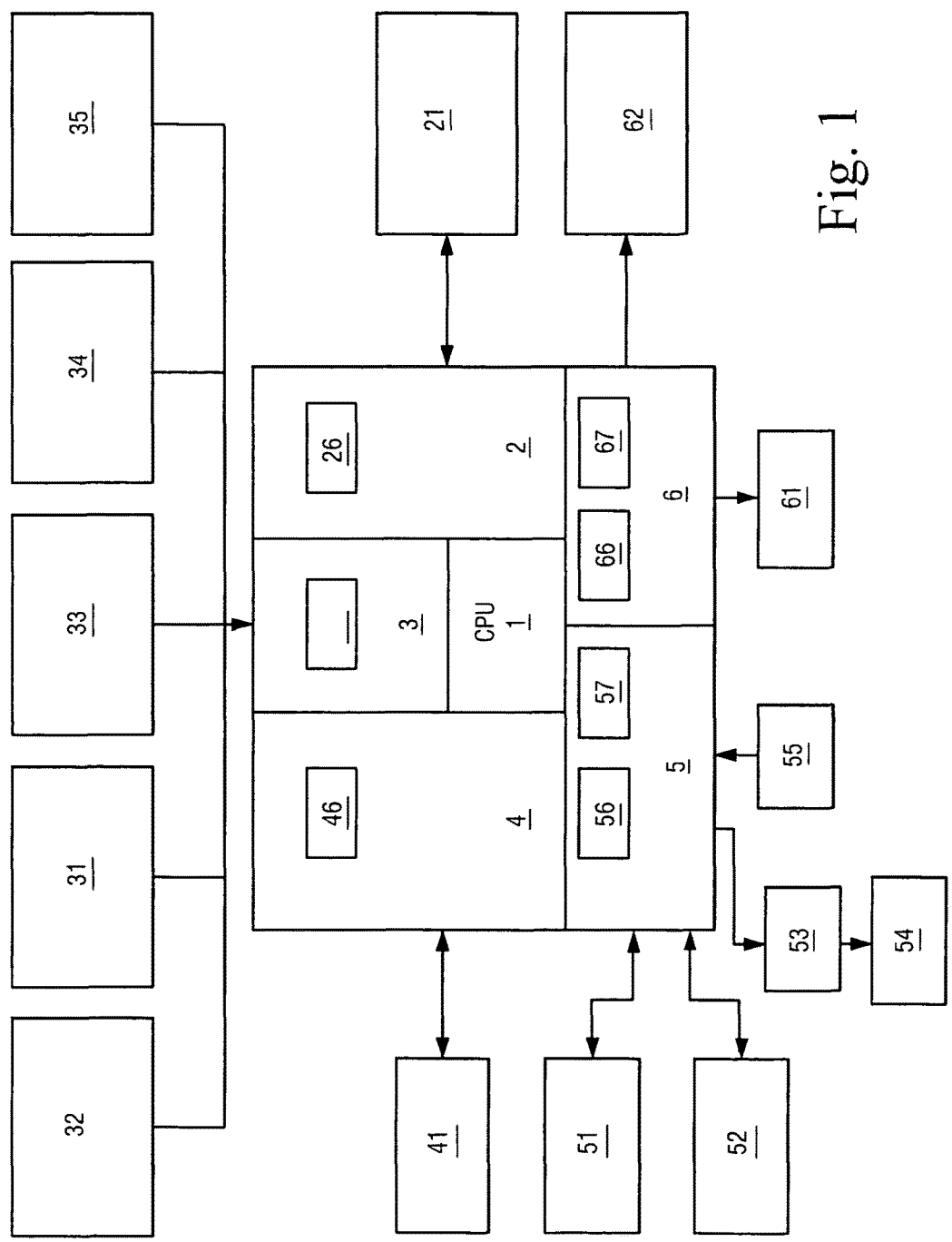
FIG. 1 shows a flow diagram of the hardware that comprises the invention.

Referring to FIG. 1, a central microprocessor unit (1) is a high-performance PC-compatible system, such as the Intel 80482 DX/2 type, which has the following memory resources and characteristics:
  compatibility with the local Vesa bus;
  processor cache memory: 256 Kbyte;
  read-write memory: 32 Mbytes or more of RAM, auto-supply;
  high-performance serial and parallel ports;
  SVGA graphics adapter with microprocessor;
  SCSI/2 bus controller.

Other processors having equivalent or better levels of performance may be used in the invention.

This central unit (1) controls and manages a sound control circuit (5), a telecommunications control circuit (4), an input control circuit (3), a bulk memory control circuit (2), and a circuit for controlling the display (6). The display consists primarily of a video monitor (62) with a flat non-interlaced screen, for example of the SVGA type with high resolution and low radiation. The monitor is used to reproduce images (for example, the album covers of the music selections), graphics, or video clips.

A bulk memory (21) uses high-speed, high-capacity hard disks and is connected to the memory already present in the microprocessor device. The bulk memory stores digitized and compressed audiovisual information.

A high-speed telecommunications modem (41), with a speed of at least 28.8 Kbps, or any other telecommunications hardware connected to other telecommunications media is integrated to enable the connection to an audiovisual information distribution network that is controlled by a central server.

In order to reproduce the sound information of the musical selections, the system includes speakers (54) that receive the signal from a tuner amplifier (53), which is connected to a music synthesizer electronic circuit (5). The system supports a large number of input sources while providing an output that ensures CD (compact disk) quality, such as, for example, the microprocessor-based multimedia audio adapter, like the "Sound Blaster" SBP32AWE sound card from Creative Labs Inc. to which two memory buffers (56,57) are added for the purpose explained above.

Likewise, the circuit for controlling the display (6) also contains two buffer memories (66, 67) for the purpose explained above.

A ventilated, heat-regulated 240-watt power supply supplies power to the system. This power supply is protected against overvoltages and overdriving.

Via an input controller circuit (3), the audiovisual reproduction system manages an "Intelli Touch" touch screen (33) from Elo Touch Systems Inc., which includes a glass cover panel that utilizes the "advanced surface wave technology," as well as an AT bus controller. This screen serves as an interface for selection information used by the customers via the video monitor (62) or a TV monitor (61), as well as control information and management oversight information used by the manager or owner of the system. It is also used for purposes of maintenance in combination with an external keyboard (34) that is connected to the system, which for this purpose has a keyboard connector controlled by a key lock (32) through the interface circuit (3).

The interface circuit (3) also interfaces with the system via a remote-controlled assembly (31) which consists of, for example:
  an infrared remote control from Mind Path Technologies Inc., consisting of a transmitter with 15 control keys for the microprocessor system and eight control keys for a projection device; and
  an infrared receiver with serial adapter from Mind Path Technologies Inc.

A fee payment device (35) from National Registers Inc. is also connected to the input interface circuit (3). Any other device that makes it possible to receive payment using coins, tickets, tokens, magnetic cards, smart cards, or a combination of means of payment can also be used.

To accommodate the system, there is also a chassis or steel frame with personalizable external fittings.

A wireless microphone (55) is connected to the sound controller, which makes it possible to convert the latter into a powerful public-address system or a karaoke machine. Likewise, the remote-control system (31) allows the manager, for example from behind the bar, to access and monitor various controls such as:
  the start-stop control for the microphone;
  the speaker mute control;
  the volume control;
  the control for canceling the musical selection currently being played.

Two buffers (56,57) are associated with the sound controller circuit (5) for each alternatively storing an item of information corresponding to least a quarter of a second of sound. Likewise, two buffers (66, 67) are associated with the video controller circuit (6) and are able, each by itself and alternatively, to store at least a tenth of a second of images. Finally, a respective buffer (46, 36, 26) is connected to each of the communication controller circuit (4), the input interface circuit (3), and the storage circuit (2).

The software for operating the system was developed around a library of tools and services that is largely oriented toward the audiovisual domain in a multi-media environment. This library will advantageously include a multi-task operating system that makes it possible to execute multiple fragments of code simultaneously and efficiently. This operating software thus makes it possible to concurrently execute, in an orderly manner and avoiding any conflict, operations that are carried out on the display and the sound reproduction structure, as well as to manage the telecommunications links via the distribution network. Moreover, this software is highly flexible.

As will be seen below, the library of tools includes a programming interface for the touch screen (33) that is associated with each graphic module, which will be described below and which includes, depending on the associated graphics module, functions for reacting to activation by one or more external events. The external events come from the user and are processed via the touch-screen interface so that they can be interpreted by the operating system as the equivalent of a mouse event. Thus, touching a zone is recognized by the touch-screen interface as a push event (down), the moving of the finger on the screen as a drag event (drag), and the removal of the finger from the screen as the release of a button (up). Each event that is interpreted by the associated touch-screen interface is then delivered to the corresponding module in order to trigger either a modification of a running program by calling, for example, another graphic module, or a modification of the physical parameters of the machine by causing these parameters to be stored and ensuring later use by the electronics associated with this parameter.

The digitized and compressed audiovisual data are stored in the bulk memory (21).

Each selection is available in two digitized formats with hi-fi or CD quality.

Figure 2:
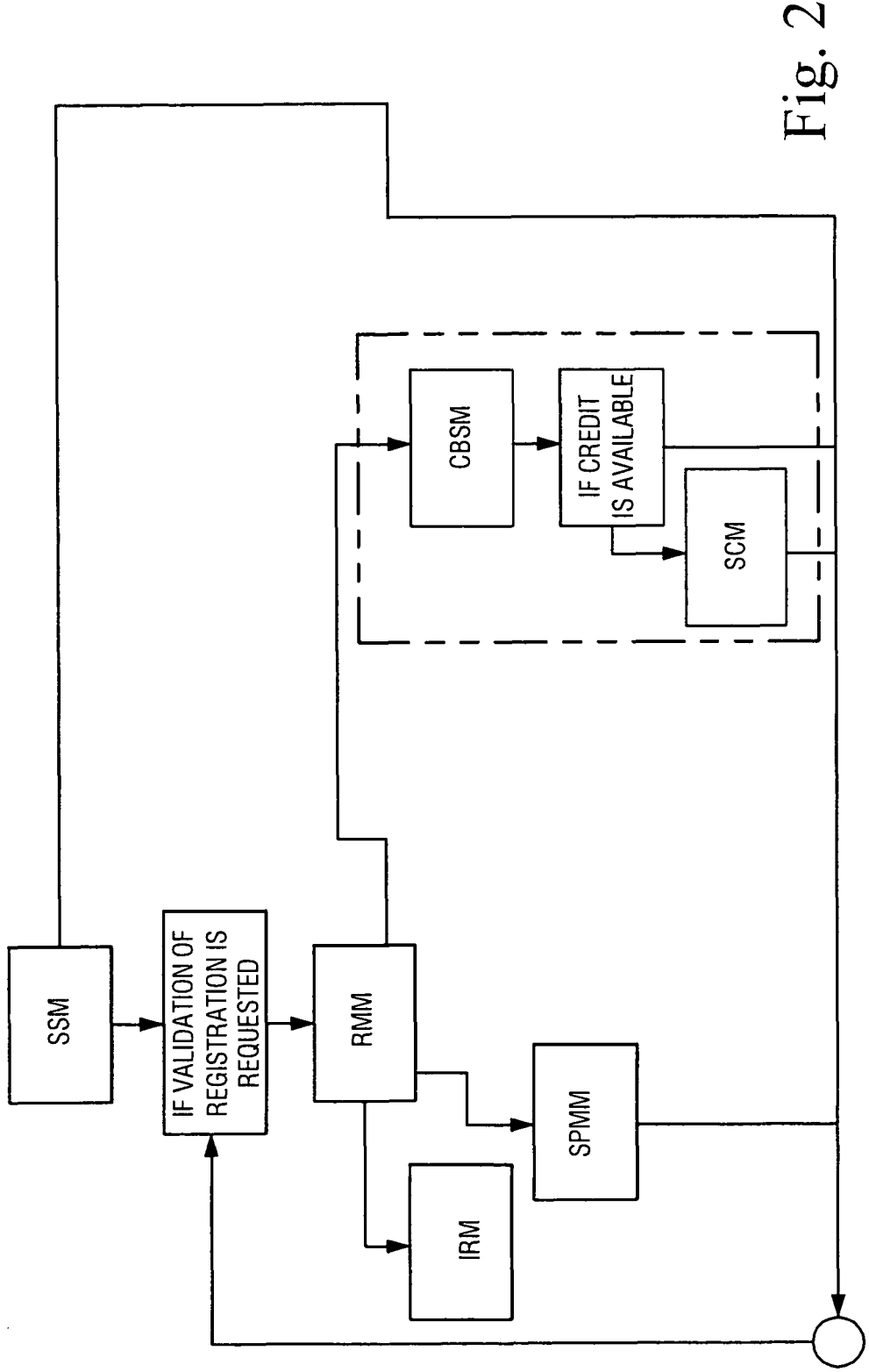
FIG. 2 shows a flow chart that indicates the specific service modules of a task and which, by means of the multi-task operating system, manages all of the modules that are included in a library stored in the bulk storage.

Before describing the flow diagram in FIG. 2, it must be noted that, although all these modules, described separately, seem to be being used serially, in reality the specific tasks of these modules are being executed simultaneously in an environment using the multi-task operating system. Consequently, the flow diagram indicates specific operations that a module is supposed to carry out and not a branch to this module that would invalidate all of the operations executed by the other modules.

The first module, marked SSM, is the module for starting the system. This module provides only a single service, and therefore it is loaded automatically as soon as the system is powered up. If the system is started with a valid registration number, it then goes directly into the "in service" mode of the module marked RMM.

The RMM module is the module of the "in service" mode, which is the operating mode that the system enters as soon as its registration number is validated. In this mode, the system is ready to handle any request that can be triggered by various predefined events, such as for example:

customers who touch the screen: when a customer or a user touches the screen, the system transfers control of its first-level session to the CBSM module of the customer selection and operating mode;

receipt of a remote-control signal: when a command is received, it is processed in a background session by the system command module SMM while the foreground session remains available for other actions;

the appearance of an end of time-out indicating that the system is inactive: when one of the various timers is activated, control is temporary turned over to the inactivity routine module IRM for processing.

The system remains in the "in-service" mode until one of the events described above occurs.

Figure 7:
FIG. 7 shows the graphic display that is created when the audiovisual reproduction system plays a selected recording.

Thus, the RMM module of the "in-service" mode includes a module that makes it possible to deliver a graphic display corresponding to, e.g., that of FIG. 7. This graphic module makes it possible to display a window (80) that contains, for example, a "NOW PLAYING" indication in a zone (81).

Figure 6:
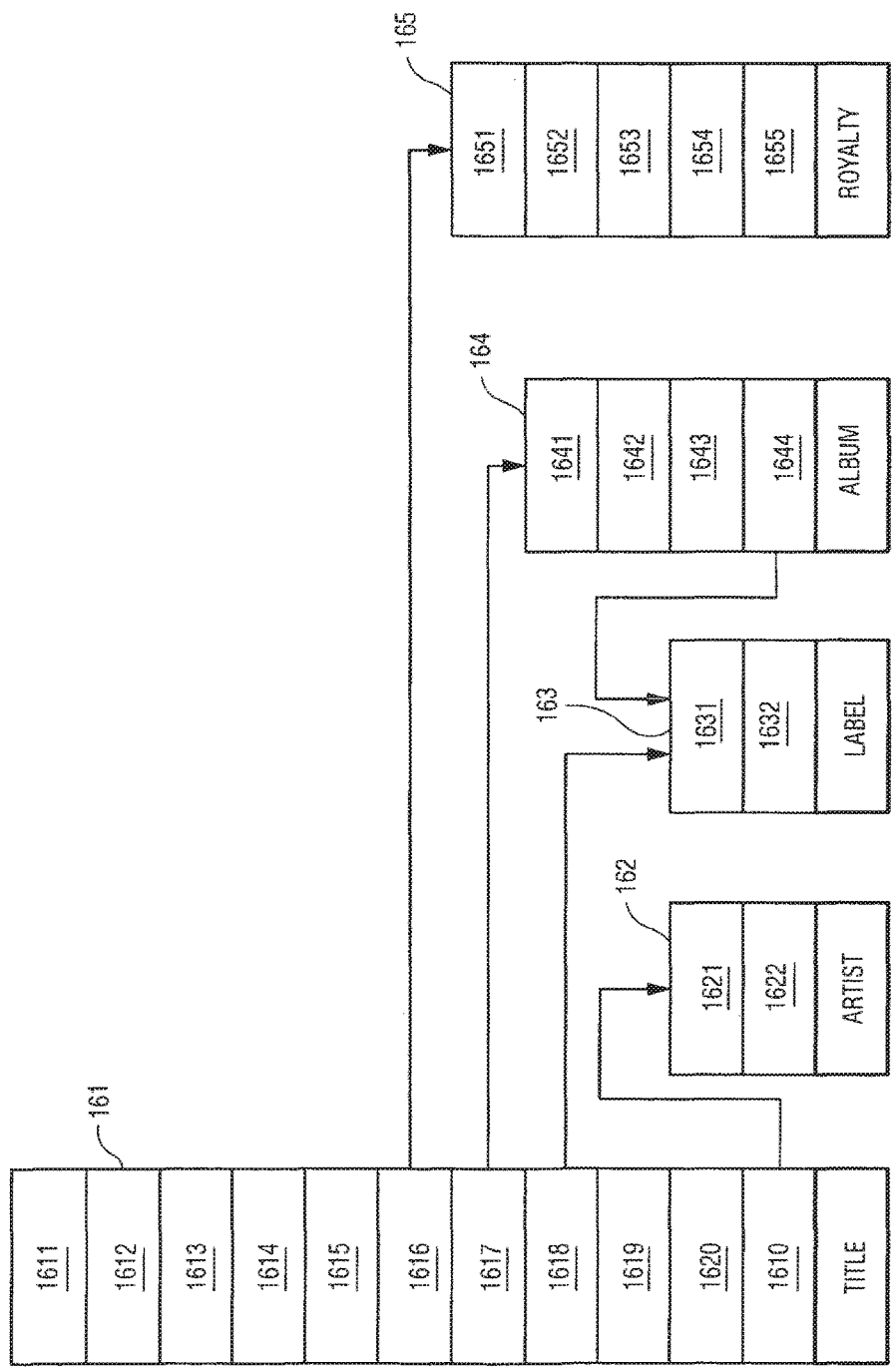
FIG. 6 shows the organization diagram of the databases.

A second window (82), which is smaller and is contained in the first window (80), makes it possible to graphically display the cover of the disk being played. In an alphanumeric tile (83), the title of the album currently being played is displayed, and in a second alphanumeric tile (84), the name of the album is displayed. A third alphanumeric tile (85) indicates the name of the artist or the group. This information comes from the database (16) based on the identification number of the title and on information that is stored in the database according to the access procedures as indicated in FIG. 6, explained below. Finally, the window (80) contains a zone (86) that gives the direction "press" or "touch me," urging the user to press his finger against the screen so that the RMM module, by detecting via the touch-screen interface module the position of the finger on any zone of the screen, transfers control of its session to the CBSM module of the mode for selection and searching of the selections by the customer.

In the event that the jukebox is no longer playing a song and when the end of the songs in the queue has been reached, the screen can display advertisements or the sample selections entered into memory by the jukebox manager. The purpose of these selection samples is to persuade the customer to listen to the entire song. The samples can be presented randomly or in an order that is pre-selected by the manager. This pre-selection is stored and serves as a search criterion for searching the jukebox database.

The IRM module is the inactivity routine module. This module contains routines that implement predefined functions such as the displaying of an album cover, the playing of snatches of musical works available in the system, the reproduction of complete selections for internal advertising purposes, audio reproductions for external advertising purposes, voiced-over advertising announcements of new musical selections, and the return to an auxiliary source. These options can be called up when the system is inactive and when a predefined, but adjustable, period of time, corresponding to a time-out, has elapsed.

A programming interface module (153) for the touch screen (33) contains different modules. Each of the sub-modules corresponds to one of the graphic modules indicated above.

The CBSM module is the customer search and selection mode module. Access to this module is triggered starting from the "in service" mode of FIG. 7 when the customer touches the screen. The display allows the user to display a selection menu, shown in FIGS. 8 and 9, to enable a powerful search tool and to aid the user in making his choice of musical selections.

Figure 8:
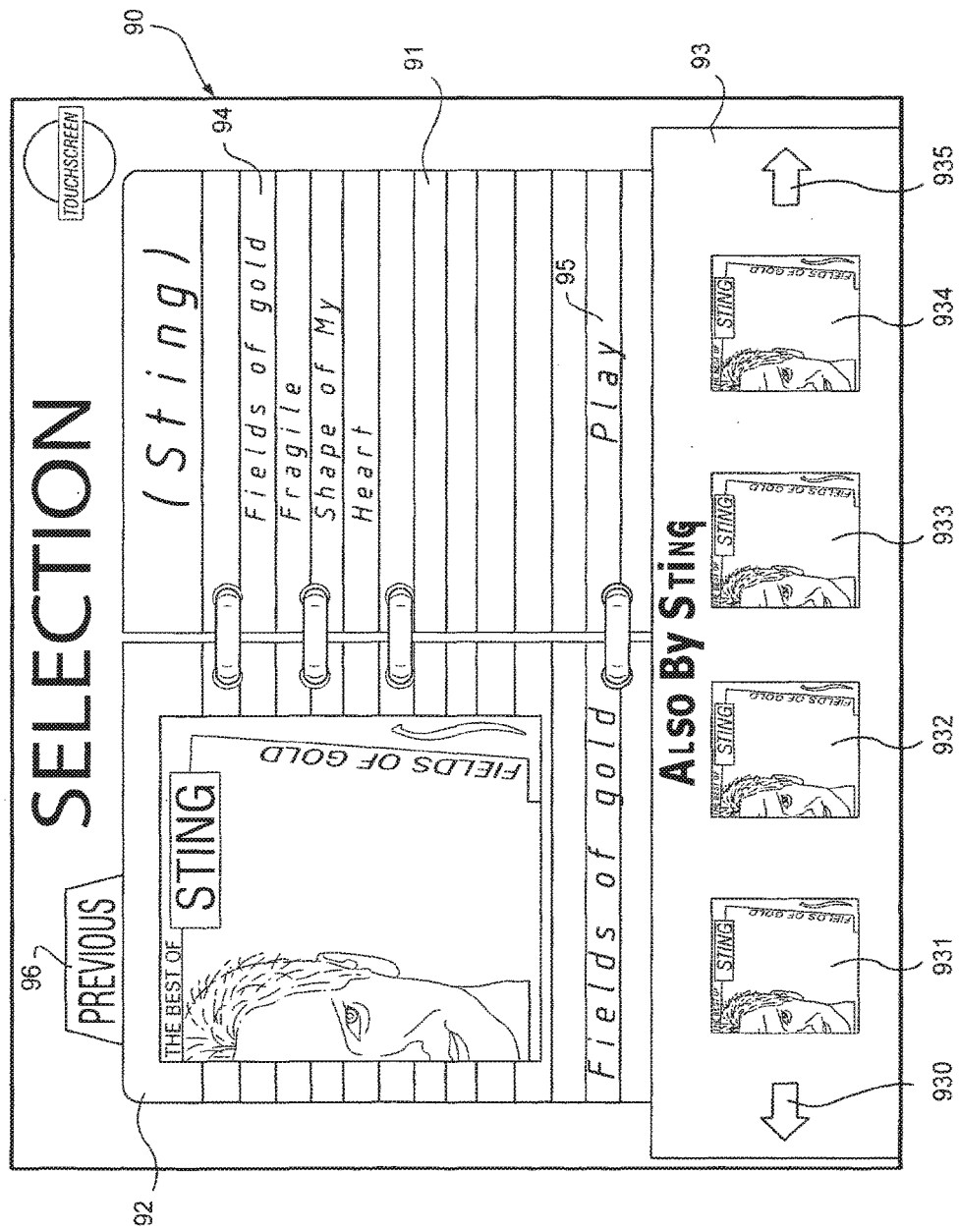
FIG. 8 shows an example of a graphic display corresponding to a first selection menu implementation mode.

FIG. 8 shows a first variant of the selection menu in which the monitor screen makes it possible to display a window (90), inside of which is an agenda that is equipped with, for example, an index (96). On one of the pages of the agenda is a display window showing the cover of an album (92), and on the other page (91) are a list (94) of the titles included in the album, and an alphanumeric tile (95), which makes it possible to initiate the playing of the recording that has been selected in advance by touching one of the titles on list (94). This action selects the title by, for example, highlighting. At the bottom of the screen is a strip (93) in which there are number of small windows (931-934) corresponding to different album covers belonging to the same musical group or the same singer. Directional arrows (930,935) make it possible, by touching these arrows, to scroll through the different covers not displayed in the small windows, either upward (930) or downward (935), that are available for the same group or singer.

In another embodiment of the interface shown in FIG. 9, the interface is divided into two sub-windows. In a first sub-window (100A), a number of small zones of sub-windows (101-106) in which a different image of each cover containing an album is displayed in each sub-window (101-106). Scrolling arrows, which are not shown and are identical to those (930, 935) in FIG. 9, make it possible to scan the other covers that are available. In another zone of the first sub-window (100A) selection criteria, for example, by new releases (111), by popular artists (112), by the names of artists (113), and by albums (114) are displayed. The second subwindow (100B) of the main window is divided into two parts, whereby a first part includes three selection criteria: a first criterion based on category (109), a second criterion based on index (108), and a third criterion based on era (110). A second part (107) of the sub-window (100B) displays an option for the user to select one of the decades that are displayed, for example, in alphanumeric tiles (1071-1076), each of which displays a decade in order to cover decade by decade, e.g., the half-century between 1940 and 1990. Thus, as can be understood, the touch-screen interface software associates with each of the touch-screen zones corresponding to a display zone a selection criterion that is used as a criterion for searching the database in order to access graphical or alphanumeric or audio data that are available in the database. Depending on need, this criterion is associated with an increment in the number of display windows shown at one time on the screen in order to select, for example, the number of graphical data corresponding to the maximum number of covers shown on the screen.

Here again, a programming interface module (153) for the touch screen (33) is connected in such a way that touching the different zones corresponding to the zones of action or scroll arrows is correctly interpreted by the interface module (153). Likewise, each graphic module will include a module that makes it possible to use the database (16) in the corresponding way later, which is described in connection with FIG. 6. This use of the database makes it possible, when the button "popular," for example, is touched, to display successively in each of display tiles (101-106 or 931-934) the images of an album and various names of popular music artists that are available.

The multi-task operating system is one of the essential elements that makes it possible to simultaneously execute multiple fragments of code and to manage the priorities among the different tasks that are called.

Figure 3:
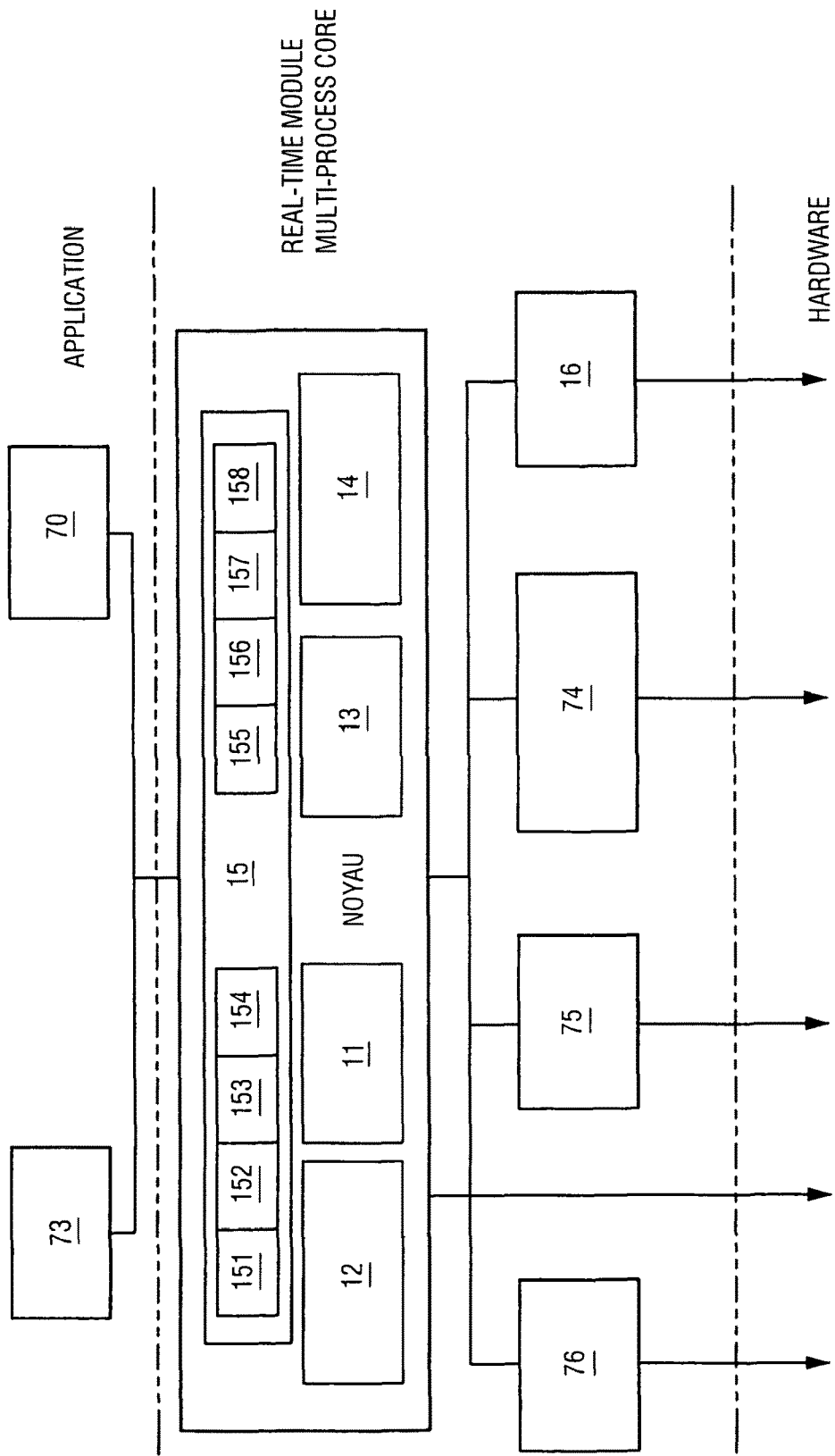
FIG. 3 shows the organization of the multi-task system that manages the hardware and software structure.

As shown in FIG. 3, this multi-task operating system is organized around a core that comprises a task priority resolution module (11), a task supervisor module (12), a sterilization module (13), and a communication process module (14). Each of these modules communicates with application programming interfaces (15) and the database (16). There are as many programming interfaces as there are applications. Module (15) also includes a first programming interface (151) for key switch (32), a second programming interface (152) for remote control (31), a third programming interface (153) for touch screen (33), a fourth programming interface (154) for keyboard (34), a fifth programming interface (155) for payment device (35), a sixth programming interface (156) for sound control circuit (5), a seventh programming interface (157) for video control circuit (6), and a last interface (158) for telecommunications control circuit (4).

Five tasks, in descending order of priority, are managed by the operating system, a first task (76) for the video inputs/outputs having the highest priority, a second task (75) of level two regarding sound, a third task (74) of level three for telecommunications, a fourth task (73) of level four for the interfaces, and a fifth task (70) of level five for management. These priority orders will be taken into account by the priority resolution module (11) as tasks appear or disappear. Thus, as soon as a video task appears, the other tasks being run are suspended, priority is given to this task, and all of the system's resources are dedicated to the video task. At the output, the purpose of video task (76) is to unload the video files from both memory (21) towards one of the two buffers (66, 67), while the other buffer (67, or 66, respectively) is used by the video controller circuit (6) to produce the display after the data are decompressed. At the input, the purpose of the video task (76) is to transfer the data received at the telecommunications buffer (46) to the bulk memory (21) and one of two buffers (26) of the bulk memory (21). The same is true of the sound task (75), on the one hand, at the input between the telecommunications buffer (46) and the buffer (26) of the bulk memory (21) and, on the other, at the output between the buffer (26) of the bulk memory (21) and one of two buffers (56, 57) of sound controller circuit (5).

Figure 4:
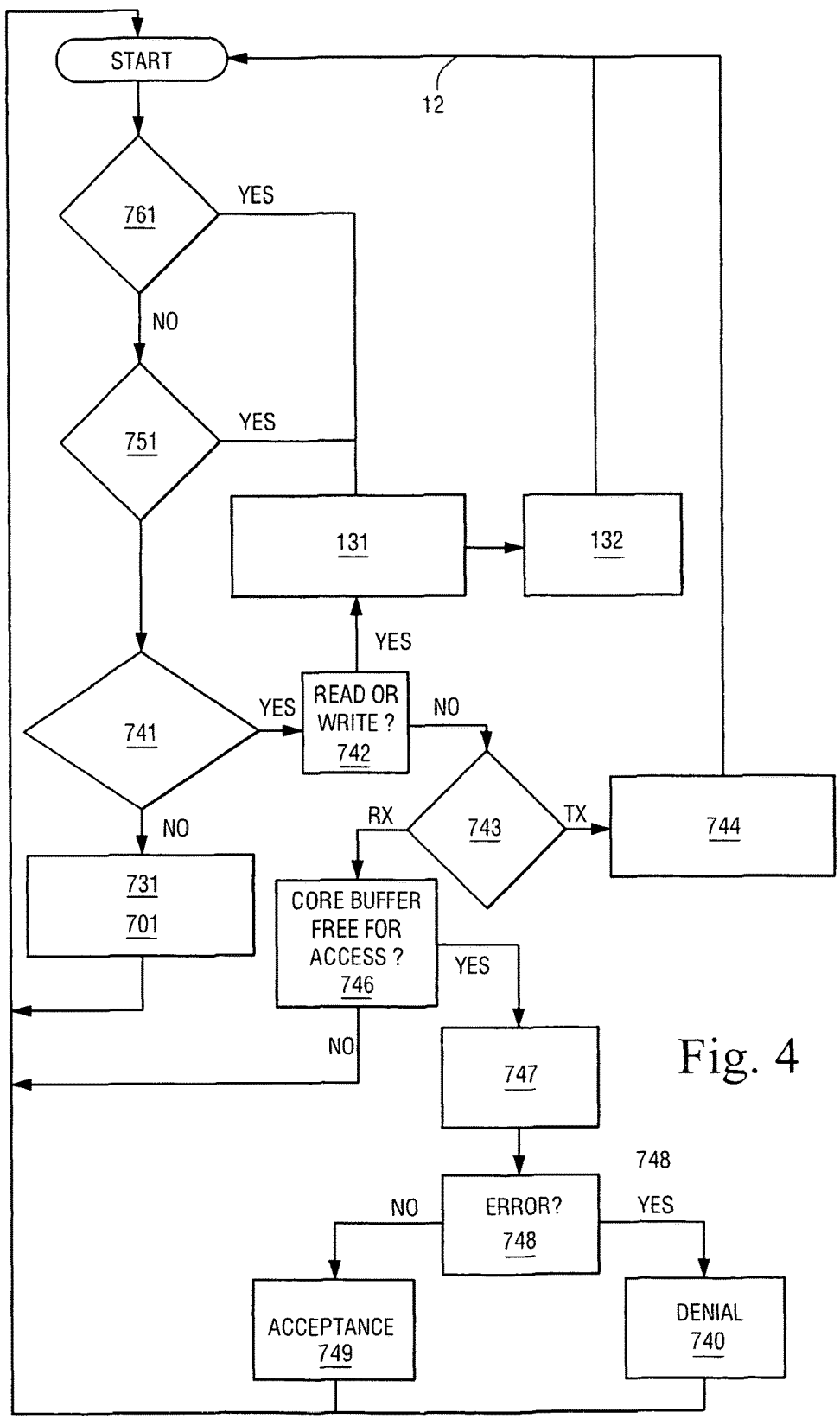
FIG. 4 shows a logic diagram describing the operation of the multi-task management system.

The task supervisor module (12) will now be described in connection with FIG. 4. This module carries out, in order of priority, a first test (761) to determine whether the video task is active, i.e., whether one of the video buffers (66, 67) is empty. In the event that the response is negative, the task supervisor module moves on to the next test, which is a second test (751) for determining whether the sound task is active, i.e., whether one of the buffers (56, 57) is empty. In the event of a negative response, a third test (741) determines whether the communications task is active, i.e., whether the buffer (46) is empty. After there is an affirmative response to one of the tests, at stage (131), the task supervisor module (12) fills a memory access request queue and at stage (132) fulfills this request by reading or writing between the bulk memory (21) and the buffer that corresponds to the active task, and then goes back to the first test. When test (741) for determining whether a communication is active is affirmative, the supervisor (12) runs a test (742) to determine whether information is being written into or read in memory. If yes, the write or read request is placed in the queue at stage (131). Otherwise, at stage (743) the supervisor determines whether it is a case of transmission or reception and, in the case of transmission, at stage (744) the supervisor sends the information block to the central server. In the case of reception, at stage (746) the supervisor verifies that the buffers of the core are free for access and, if the response is yes, sends a message to the central server to accept receipt of a block of data at stage (747). If the response is negative, the initial tests are restarted. After a block is received, an error check (748) of the cyclic redundance type SRC (Cyclic Redundant Check) is carried out. The block is rejected at stage (740) in the event of an error or else accepted if there is no error by sending a corresponding message to the central server indicating that the block bearing a specified number is rejected or accepted, and it then goes back to the initial tests. In the event that no higher-level task is active, at stage (731) or stage (701) the supervisor ensures the processing of the interface or management tasks and then goes back to the starting tasks.

Figure 5:
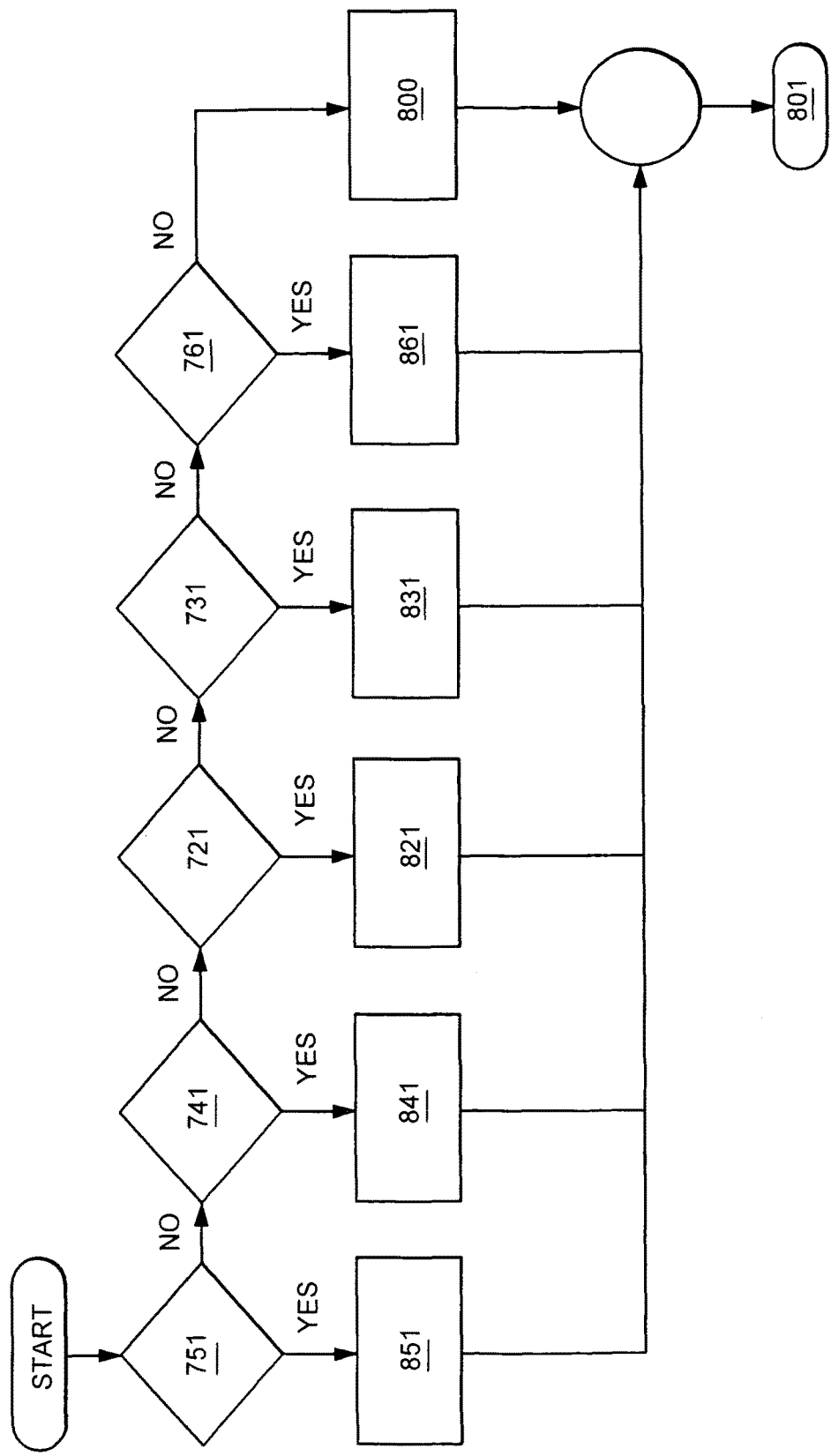
FIG. 5 shows a logic diagram for verifying the active state of the tasks.

As FIG. 5 shows, the detection of an active or ready task is accomplished by a corresponding test (721-761) at each of corresponding software or hardware modules (26) of the hard disk, interface buffer (36), telecommunications buffer (46), sound buffers (56 and 57), and video buffers (66 and 67), which are associated with each of respective controller circuits (2, 3, 4, 5, 6) of each of the hardware devices associated with central unit (1). Test (721) makes it possible to see whether there are data present in the input/output memory buffer of the disk, test (731) makes it possible to see whether data are present in the hardware or software memory buffers of the customer interface device, test (741) makes it possible to see whether data are present in the software or hardware memory buffers of the telecommunications device, test (751) makes it possible to determine whether data are present in the hardware or software memory buffer for the sound, and test (761) makes it possible to see whether data are present in the hardware or software memory buffers of the video device. If one or more of these buffers is (are) filled with data, the supervisor (12) positions respective status buffer(s) (821) for the hard disk, buffer (831) for the interface, buffer (841) for telecommunications, buffer (851) for the sound, and buffer (861) for the video corresponding to the hardware in a logic state that is indicative of the activity.

Otherwise, at stage (800), the status buffers of the supervisor are brought back to a value that is indicative of inactivity.

The operating status of the system is retained on the hard disk.

Each time a significant event is initiated, the system records it immediately on the disk.

Thus, in the event of a power failure or equipment malfunction, the system will be able to start up again right where it was interrupted.

The events that trigger the protection of the operating status are:

insertion of money (addition of credit);
the addition of a selection to the queue;
the end of a selection (changing of the selection currently being played).

The file is in a machine format that can be read only by the unit and takes up no more than 64 bytes.

In fact, based, on the one hand, on the task management module, whereby the highest priority is given to the video task and, on the other hand, on the presence of the hardware or software buffers that are assigned to each of these tasks to temporarily store the data and on the presence of the status buffers relative to each task, it is possible to have all of these tasks managed by a single central unit with a multi-task operating system that offers the ability to provide a video display, i.e., animated images opposite a graphical representation in which the data to be processed are less complex. This use of a video presentation can also be done without hampering the processing of the sound owing to the fact that the sound controller circuit (5) contains buffers that are large enough to store enough compressed data to make it possible, while the sound is being processed, to transfer video data to one of the video buffers (66, 67) while waiting for the next transfer of sound data.

Moreover, the multi-task operating system includes a library that contains a set of tools and services and makes it possible to accelerate the operation significantly due to the fact that it is integrated into the storage and to the great flexibility that is thus provided. In particular, this makes it possible to create a multimedia universe by simultaneously managing, in a simple and effective manner, the reproduction of sound, the displaying of images or graphics, video animation, and the user interface. As shown in FIG. 6, the database (16) is composed of several bases.

A first base (161) covers the titles of the audiovisual works, a second base (162) covers the artists, a third base (163) covers the labels (LABEL), a fourth base (164) covers the albums, and a fifth base (165) covers the fees. The first base (161) contains a first item of information (1611), corresponding to the title of the work, and a second item of information (1612) corresponding to the identification of the product. This product identification is unique. A third item of information (1613) relates to the music category, i.e., jazz, classical, variety, etc. A fourth item of information (1614) indicates the date of the update. A fifth item of information (1615) indicates in seconds the time required to play the piece. A sixth item of information (1616) is a link to the fee base, and a seventh item of information (1617) is a link to the album. An eighth item of information (1618) is a link to one of the "LABEL" labels. A ninth item of information (1619) indicates the purchase price for the manager of the jukebox. A tenth item of information (1620) indicates the amount of the fee for each play of the work. An eleventh item of information (1610) is a link to the base on the artists. This link consists of the identity of the artist (1621) and the name of the group (1622).

The album information base contains the album identity (1641), which is a link to the seventh item of information (1617) of the title base. The album information base also contains the title (1642), the update date of the album (1643), and the label identity (LABEL) (1644).

When an audio or audiovisual selection is being played, touching the screen initiates a search by artist name of the various albums and the display of a number of different albums by the same singer or group that are available in the database corresponding to the number of display windows or tiles. If the number of albums exceeds the number of windows, the software displays only the next n albums corresponding to the album played, and the user can display them by touching the scrolling arrows. When the jukebox is not playing an audio or audiovisual selection, the program initiates, e.g., by randomly scanning the database, the display at regular intervals of sets of images of covers of different albums that are available by random selection or by other selection criteria that are determined by the program. Touching a screen zone that is associated with a selection criterion initiates a program to search the database for data corresponding to the criteria and then makes it possible to send these data to the display management software for display, in each of the windows, of the images corresponding to the data selected on the basis of the criterion that is activated.

Any modification that is within the grasp of one skilled in the art is also part of this invention. Thus, with regard to buffers, it should be recalled that buffers may be present either physically on the circuit to which they are assigned or they may be implemented by software by reserving storage sites in the system memory.

The invention claimed is:
1. A jukebox system, comprising:
a jukebox device including a microprocessor, a local computer memory that maintains a local database of digitized songs of artists and related graphical items corresponding to album covers associated with each of the digitized songs, a display for displaying video, an audio circuit providing audio, a network interface configured to enable the jukebox device to communicate with an audiovisual distribution network, and a multitasking operating system configured to enable simultaneous operation of the microprocessor, the display, the audio circuit and the network interface;

a server remote from said jukebox device that is accessible by the jukebox device through said distribution network, wherein the jukebox device is configured to play said digitized songs from said local computer memory on the jukebox device in response to requests by a user when in service; and wherein said server maintains a master database of songs and graphics that are selectively distributable to, and storable in said local computer memory of, said jukebox device;

wherein said display on said jukebox device is a touch sensitive display that is configured to provide, at least in part, a user interface for operating said jukebox device by enabling the user to select songs from said local computer memory for playing on said jukebox device, said jukebox device configured to display on said display a first arrangement of an album cover and a song name that corresponds to a song currently playing on said jukebox device;

wherein said user interface includes a display screen on said touch sensitive display that, in response to a touch on the touch sensitive display while displaying the first arrangement, newly displays a second arrangement in which a plurality of said graphical items corresponding to album covers for songs stored in said local computer memory, and a navigation interface element arranged to enable the user to scroll the display screen in order to show further album covers for songs stored in said local computer memory;

wherein, upon touch selection by the user of one of the displayed album covers in the second arrangement, the user interface is configured to display a third arrangement including the selected album cover and a list of available songs stored on the local computer memory that exist on the album represented by the selected album cover;

wherein, upon touch selection by the user of a song from the displayed list of available songs, the selected song is queued for playing on the jukebox device; and wherein said jukebox device is provided with a registration process configured to register the jukebox device with the server, and a registration checking process configured to check, upon startup of the jukebox device and prior to placing the jukebox in service, that the jukebox device has been registered with the server to play songs stored on the local computer memory, the registration process and the registration checking process being performed exclusively by the jukebox and not a human user, wherein the registration checking process is initiated by a startup module executed immediately upon the jukebox device being powered up, wherein the jukebox device transitions to an in service mode as soon as the jukebox device's registration number is successfully validated during the check and wherein the in service mode includes a background session to process received remote control signals and a foreground session for processing other actions.

2. The jukebox system of claim 1, wherein the user interface is further operable to display graphical items representing any additional album covers of the same artist as the selected album cover for which songs exist on the local computer memory.

3. The jukebox system of claim 2, wherein, upon touch selection by the user of one of the displayed additional album covers of the same artist as the previously selected album cover, a newly selected album cover is defined and the user interface is operable to display the newly selected album cover, a list of songs on the local computer memory that exist on the album represented by the newly selected album cover, and graphical items representing any additional album covers of the same artist as the newly selected album cover for which songs exist on the local computer memory.

4. The jukebox system of claim 2, wherein said user interface is operable to display up to a predetermined number of said additional album covers of the same artist as the selected album cover for which songs exist on the local computer memory, and further wherein said user interface includes navigation interface element to enable the user to selectively scroll through the additional album covers of the same artist when more than the predetermined number of additional album covers exist.

* * * * *